UNITED STATES PATENT OFFICE.

WILLIAM ANSYL PHILLIPS, OF ST. LOUIS, MISSOURI, ASSIGNOR TO HIMSELF, FRANK M. RUMBOLD, AND AMEDEE V. REYBURN, JR., OF ST. LOUIS, MISSOURI.

COMPOSITION OF MATTER AND THE METHOD OF MAKING THE SAME.

933,723. Specification of Letters Patent. Patented Sept. 7, 1909.

No Drawing. Application filed February 18, 1907, Serial No. 357,813. Renewed March 5, 1909. Serial No. 481,542.

*To all whom it may concern:*

Be it known that I, WILLIAM ANSYL PHILLIPS, a citizen of the United States, residing at St. Louis, in the city of St. Louis and State of Missouri, have invented a certain new and useful Composition of Matter and the Method of Making the Same, of which the following is a full, clear, and exact specification.

This invention relates to a composition of matter and its method of production, more especially designed for use as an electric conductor where conductors of high resistance are required, as, for example, in resistance boxes for rheostats, electric heaters, etc., and the invention has for its primary object to provide an improved composition of matter of the described character, which will be efficient and lasting.

Another object of the invention is to provide an improved composition of matter of the described character which will be practically indestructible by the electric current.

With these ends in view, the invention consists in certain features of novelty which will now be fully described, and then more particularly pointed out in the claims.

This improved composition of matter consists primarily of carbonate of lime and a metallic conductor such, for example, as iron in varying proportions fused and melted together.

In producing the improved product of this invention the iron is preferably taken in the common form of iron pyrites or any equivalent product of iron and sulfur. In order to secure a thorough mixture and commingling of the materials the iron pyrites or its equivalent is preferably ground or crushed and mixed with carbonate of lime and a sulfur flux after which the compound is subjected to heat until all of the materials are melted in the presence of each other and fused together. After the compound is subjected to a sufficient degree of heat to melt and fuse the materials to the desired degree, it may be molded in any suitable manner and in any desired form, and after cooling will be ready for use.

It will be apparent that the material may be given any desired quality of conductivity by varying the proportions of the ingredients. The iron pyrites or its equivalent is a good conductor and the carbonate of lime is a non-conductor. It will also be apparent that the degree of fusion that will take place between the iron pyrites and the carbonate of lime or their equivalents will depend upon the quantity of the sulfur flux introduced into the compound.

What I claim is:

1. The herein described composition of matter containing a metallic electric conductor and carbonate of lime fused together.

2. The herein described composition of matter containing iron pyrites and carbonate of lime fused together.

3. The herein described composition of matter containing iron, carbonate of lime, and a sulfur flux, melted and fused together.

4. The herein described composition of matter containing iron pyrites, carbonate of lime and a sulfur flux melted and fused together.

5. The herein described method which consists in mixing iron and carbonate of lime and fusing them together in the presence of a sulfur flux.

6. The herein described method which consists in mixing iron pyrites with carbonate of lime and a sulfur flux and subjecting the same to a degree of heat sufficient to melt and fuse the materials together.

In testimony whereof I have signed my name to this specification, in the presence of two subscribing witnesses, on this 14th day of February A. D. 1907.

WILLIAM ANSYL PHILLIPS.

Witnesses:
LEO C. ROBERTS,
D. CLINTON HOLLOCHER.